Patented July 12, 1927.

1,635,972

UNITED STATES PATENT OFFICE.

BANESVAR DASS, OF BLOOMFIELD, NEW JERSEY, ASSIGNOR TO ELLIS-FOSTER COMPANY, A CORPORATION OF NEW JERSEY.

MILK-SUGAR BISCUIT.

No Drawing.   Application filed February 18, 1922. Serial No. 537,605.

This invention relates to biscuits such as cookies, crackers, wafers etc. made with milk sugar as a sweetening and modifying agent and relates especially to a biscuit or cracker made from whole wheat.

In making whole wheat cookies such as the dry cookies put on the market in package form the use of cane sugar is considered objectionable for various reasons. Whole wheat or graham biscuit is used to a very large extent by children who prefer a sweet product. Cane sugar besides being objectionable from a physiological standpoint is not desirable for other reasons among which may be mentioned the ease with which it absorbs moisture.

I have found that milk sugar will serve as a suitable binder for whole wheat flour imparting a sufficient degree of sweetness to overcome the so-called acidulous flavor of the whole wheat product when made without any sweetening.

While cane sugar has an objectionable effect in the alimentary canal causing fermentation and the growth of undesirable microorganisms, milk sugar appears to have a desirable physiological effect especially in this respect besides having useful body-building properties. It is not unlikely that milk sugar contains some of the accessory food factors or vitamins present in milk and which are absent from cane sugar.

Milk sugar also has a desirable degree of stability under heat and does not possess the hygroscopic properties of cane sugar and molasses. Besides milk sugar when present in considerable amount has a shortening effect on the biscuit made therewith.

Milk sugar therefore may be used as a binder for whole wheat flour, overcoming the acidulous taste of the raw flour without producing an excessively sweet product even though a substantial amount of the milk sugar is introduced to produce the desired physiological effects mentioned above.

Whole wheat flour does not keep very well and especially in the summer time is liable to become infected with organisms. It is my belief that milk sugar is preferable to cane sugar as a preservative agent under the conditions of storage of whole wheat biscuit.

I have prepared cookies of good flavor and desirable crispness and shortness by proceeding as follows: In this formula it will be noted that I have used the homely method of expressing the proportion of components by cupfuls etc.

Whole wheat flour, 8 cups; ordinary flour, 4 cups; milk sugar, 6 cups; lard and butter, 1 cup of each; milk, 1½ cups; 6 eggs; baking powder, 12 teaspoonfuls; vanilla, 12 teaspoonfuls; salt 3 teaspoonfuls. After being well beaten up the dough thus produced was chilled, rolled and baked in the form of thin cookies or wafers.

The procedure afforded a cookie brown in color and of a desirable texture and crispness.

Tests made with these cookies exposed to a humid atmosphere in comparison with cookies made similarly but using cane sugar in place of milk sugar showed the milk sugar product to soften less rapidly.

I have also made tests exposing milk sugar and cane sugar to a humid atmosphere and find the cane sugar to take up moisture much more rapidly than the milk sugar.

The above formula contains a high proportion of milk sugar and the quantity may be reduced as for example to 4 cupfuls in which case the milk may be reduced to 1 cupful, the other proportions remaining the same.

If such a product is too short due to the shortening effect of the milk sugar the proportion of lard and butter may be reduced. In place of these fats liquid oils such as cottonseed or peanut oil or corresponding hydrogenated products or other fats and oils may be used as shortening agents. By using a hydrogenated oil melting at 60° C. or thereabouts a fat of good keeping quality may replace the more perishable lard and butter. The ordinary flour referred to above is the usual white bread or pastry flour. The proportion of this flour may be increased considerably and even in some cases where whole wheat is not desired may replace the whole wheat flour entirely. Such a composition does not however constitute the preferred form of my invention which relates to the combination or association of milk sugar and whole wheat flour to form a cookie or wafer capable of being put up in package form and keeping indefinitely. The milk sugar may be varied very widely from the proportions given above and I may state that I do not consider my invention is avoided by the introduction of cane sugar, glucose, molasses or other sweetening agents than milk sugar as the invention centers about the utility and applicability of milk sugar in products of this description and the addition of various ingredients to the above formula or the subtraction of ingredients mentioned other than primary ones is contemplated by me even though I have not specifically set forth a great number of formulæ therefor.

Milk has been mentioned in the foregoing composition and of course introduces with it the quantity of milk sugar corresponding to the natural content thereof in the milk. In the present invention it is the purpose to introduce predetermined amounts of milk sugar irrespective of any quantity of milk that may be added. Thus while milk or milk powders may be used their use involves the addition of other elements than milk sugar and the character of the composition therefore cannot be controlled to the same extent as when milk sugar as a separate entity is introduced.

Tests which I have made feeding milk sugar to animals have satisfied me that the continued ingestion of milk sugar in products of this character will not be harmful and that no toxic effects or any condition resembling auto-intoxication is liable to ensue through the continued ingestion of milk sugar in this manner even though the proportion of this sugar in the food product is far greater than any normal amount such as might be the case with products in which milk sugar is introduced from milk alone. On the other hand the feeding tests that I have conducted satisfy me that milk sugar has very desirable growth-producing properties in addition to its useful effect in giving a desirable texture and flavor to the baked product mentioned.

The composition to which I lay claim is therefore not one containing the insignificant amounts of milk sugar which would be introduced by the use of milk itself and which would have no sensible sweetening effect but ordinarily insufficient in amount to even overcome the natural acidulous taste of whole wheat flour biscuit made without added sugar rather it is my purpose to make a product containing preferably several percent of milk sugar and upwards as for example from 5 to 25% of this sugar so that it may exert a substantial influence on the product in several ways such as removing acidulous taste etc. and also be present in material amount to confer a beneficial physiological effect.

I may note that cane sugar has a much lower melting point than milk sugar and the latter in fact melts at a temperature somewhat higher than that usually employed in baking. In experiments which I have made heating cane sugar and milk sugar in the same vessel but in separate containers I have noted that carbonization of the cane sugar sets in at about 380°–390° F. whereas carbonization in the sample of milk sugar tested did not set in until about 450°–460° F. Whether or not the higher melting point and higher resistance to carbonization are responsible for the quality and texture of the biscuit produced according to my invention or whether these results may be attributed to other properties is difficult for me to state at the present time but I am inclined to think the stability of the milk sugar under heat in comparison with cane sugar is a very desirable quality for the present purposes.

A form of the cookie or wafer containing bran as well as whole wheat flour together with milk sugar also falls within the purview of my invention.

What I claim is:—

1. A whole wheat flour biscuit containing not substantially below five percent of milk sugar.

2. A dry crisp wafer containing flour and not substantially below 5 per cent of milk sugar.

3. A dry crisp wafer containing whole wheat flour and milk sugar sufficient to eliminate the acidulous taste of biscuit made from unsweetened whole wheat flour.

BANESVAR DASS.